United States Patent [19]

Mogilevsky et al.

[11] 3,925,725

[45] Dec. 9, 1975

[54] OSCILLOSCOPIC FERROMETER

[76] Inventors: Vitaly Moritsovich Mogilevsky, ulitsa O. Zhilinoi, 92-b, kv. 23; Nikolai Filippovich Deriga, ulitsa Ilicha, 19, kv. 48; Vadim Petrovich Ekimov, ulitsa Schetinkina, 48, kv. 33; Alexandr Petrovich Erastov, ulitsa Bogatkova, 205, kv. 15; Viktor Vladimirovich Posokhin, ulitsa A. Lezhena, 30, kv. 35; Benya Elievich Furer, ulitsa Promyshiennaya, 1, kv. 12, all of Novosibirsk, U.S.S.R.

[22] Filed: Sept. 23, 1974

[21] Appl. No.: 508,470

[52] U.S. Cl. .............................................. 324/34 R
[51] Int. Cl.² ....................................... G01R 33/12
[58] Field of Search ................ 324/34 R, 34 H, 34 P

[56] References Cited
UNITED STATES PATENTS
3,358,224  12/1967  Mogilevksy et al. ............... 324/34 R
3,500,180  3/1970  Mogilevsky ....................... 324/34 R

*Primary Examiner*—Robert J. Corcoran
*Attorney, Agent, or Firm*—Waters, Schwartz & Nissen

[57] ABSTRACT

An oscilloscopic ferrometer comprising a magnetizing system in the form of a stepdown transformer having a single-turn secondary winding and at least two ellipsoidal solenoids connected thereto and mounted coaxially relative to each other with an air gap therebetween. Each ellipsoidal solenoid has a uniform pitch of hollow turns along the generatrix. Direct and return current leads establish an aiding-series connection between the solenoids and constitute an integral part of the single-turn secondary winding, the leads comprising hollow cylindrical bodies whose ends are interconnected by means of manifolds, the return current lead extending inside the direct current lead coaxially therewith. A measuring channel for magnetization has a measuring coil disposed in the central zone of the air gap and a compensation coil mounted coaxially with the current lead of the secondary winding. A measuring channel for a magnetizing field has a field intensity sensor and a circuit for measuring the parameters of dynamic remagnetization loop of a sample being tested including an oscilloscope, the ellipsoidal solenoids and the secondary winding being provided with a circulatory cooling, and the geometric dimensions of each of the ellipsoidal solenoids being selected on the basis of a predetermined relationship therebetween and with the size of the air gap.

19 Claims, 4 Drawing Figures

OSCILLOSCOPIC FERROMETER

The invention relates to the technique of rapid measurements of the magnetic characteristics of elongated bar-shaped samples and articles made of ferromagnetic materials, and more specifically to oscilloscopic ferrometers.

The invention may be used in the commercial and laboratory conditions at metallurgical, electronic and radiotechnical plants for measuring the parameters of dynamic remagnatization loops of various articles.

In ferrometers designed for the above-mentioned purposes, apart from the uniformity of field affecting the accuracy of measurements, a convenient access to the zone of application of field intensity and magnetization sensors is very important to check-up their positioning and to ensure a combination of the magnetic methods with other test methods (photo-, resistance measurements and the like).

Known in the art are ferrometers in which a uniform switching field is generated by means of a single-layer ellipsoidal solenoid inserted in a single-turn secondary winding of a stepdown transformer. Such ferrometers also comprise a measuring channel for magnetization having a measuring coil and a current compensation coil, a measuring channel for magnetizaing field having a field intensity sensor and a circuit for measuring the parameters of a dynamic remagnetization loop including an oscilloscope. The stepdown transformer and an ellipsoidal solenoid connected thereto having uniform pitch of hollow turns along the generatrix form the magnetizing means of the ferrometer. The secondary winding of the stepdown transformer and hollow turns of the solenoid are provided with a circulatory cooling.

This known oscilloscopic ferrometer cannot provide for an access to the central portion of a sample being tested where the measuring coil is located. This disadvantage is also inherent in known cylindrical solenoids with air gaps, which exhibit a low coefficient of utilization of the inner space due to a rapid change of components of magnetic field at points remote from the axis of symmetry. Where it is required to test articles made of magnetically hard high-alloy steel, such as barrels of small arms, the enlargement of the uniform zone on the account of an increase in the inside diameter of the solenoid results in a considerable increase in the power consumption of the apparatus which increases in accordance with the Fabry law, that is as the second power of diameter. The accuracy of measurement of coercive force and remanence from the oscilloscopic record of the remagnetization loop is low due to a reduced accuracy of pointer instruments used as calibration instruments in the initial zone of the scale where coercive force $J^HC$ is determined on the basis of magnetization with $J=0$ and $J_r$ with $H=0$, wherein $J$ is magnetization, $J_r$ is remanence and $H$ is the intensity of switching field. The knowledge of precise values of these parameters is very important in the technique of electromagnetic flaw detection since changes thereof are regularly related to the mechanical properties of articles, such as hardness, structure, interruptions of continuity and the like.

Among other disadvantages of the known ferrometers and other ferrometers of this type there should be noted a low accuracy and labor-consumption of the determination of the differential permeability or susceptibility as the ratio of small incremenets $\Delta B/\Delta H = \mu_d$ which represents a very important parameter in the flaw detection and in the calculation and design of many electromagnetic devices, as well as of determination of electromagnetic losses which are measured in the known ferrometers by computing the area of the loop or by using a wattmeter of the electrodynamic type.

Apart from the necessity of using a third instrument (in addition to the H and J calibrators), this ferrometer is deficient by having an increased error when testing magnetically hard materials having a large spectrum of higher magnetization harmonics, the absence of the provisions for entering the readings of a wattmeter in a digital computer for processing and analysis of the measurement data in a centralized production process monitoring system.

Further disadvantages of the known ferrometer of this type also consist in the absence of synchronization of the scanning generator of the oscilloscopic unit with magnetization and field pulses and the absence of calibration of an image of respective coordinate axes with these pulses so that the size of image is to be limited to the central zone of the screen of a cathode-ray tube where non-linear distortions are small, whereby the error in reading oscilloscopic records displayed from the screen for documentary purposes are increased.

In measuring samples having a square remagnetization loop with a large spectrum of higher remagnetization and induction harmonics, the known ferrometer is deficient in that the interturn capacitance of the measuring coil and the dissipation inductance result in the superposition of damped high-frequency oscillations on the pulse $dI/dt$ or $dB/dt$ in the form of an overshoot at the leading edge and in the form of an inverted post-pulse overshoot. Here, B is inductance in the sample being tested and t is time. In this case a known method of accelerating the dampening of parasitic oscillations by introducing non-reactive elements in the circuit is unacceptable since it would result in phase distortions influencing the shape of the image of remagnetization loop. The employment of special windings to reduce the interturn capacitance (universal winding, polyfilar winding) complicate the manufacutre of the measuring coils and impair the reproducability of the parameters, while having no appreciable effect.

The only existing method of reducing parasitic oscillations, which consists in using a reduced number of turns of the measuring coils, such as to 10–20 turns, results in a considerable decrease of the signal-to-noise ratio, lower sensitivity and more stingent requirements to electronic amplifiers of the measuring circuit.

Another disadvantage of the known ferrometers in measuring the characteristics of the materials having a square hysteresis loop consists in the error of compensation of the measuring coil which is generally equal to at least 0.5% of the amplitude $U_{um}$ of pulse of the coil without a sample, the source of this error in the sinusoidal voltage mode of power supply source of the magnetizing means being represented by higher harmonics (basically, the third harmonics) of magnetizing current of the solenoid which are due to non-linearity of the fundamental magnetization curve of the core of the stepdown transformer. The reduction of the content of higher harmonics by limiting the effective portion of the fundamental magnetization curve, as is the practice in the measuring current transformers, would result in a considerable increase in the size, weight and cost of the magnetizing means which is unreasonable because higher harmonics of substantially sinusoidal field have only a negligible influence on the process of remagnetization of the samples.

The presence and fluctuations of a certain phase shift between the measuring coil and the compensation coil (of the order of 3° in the first harmonic and 1° in the second harmonic, while higher harmonics may be ignored in the case of substantially sinusoidal field due to a smallness of the amplitude thereof) make the amplitude of the compensation error signal $\Delta U_{um}$ commensurable with the first harmonic of the spectrum of a sample having a square hysteresis loop. Thus, for a strip-shaped sample of a cold-hardened electric steel of 0.35×5 $\mu$ m cross-section accommodated in a coil with the turn number $w_n = 1000$, an average value of the active pulse length $t_a$ is about 44 $\mu$s and a signal-to-noise ratio is $$\frac{U_{1m}/U_m}{\Delta U_m/U_m} = \frac{t_a U_m}{T \Delta U_m} = \frac{0.22}{0.5} \approx 0.5$$

wherein $U_{1m}$ is amplitude of the first harmonic,
$T = 20$ $\mu$s is period of the switching field.

The above-described disadvantages are interrelated since the reduction of the number of turns of the measuring coil in order to attenuate parasitic oscillations considerably increases the compensation error.

Another disadvantage of the known ferrometer consists in the fact that the phase correction in the magnetization channel J and field channel H can be controlled by means of a frequency-band phase corrector only in accordance with the shape of image of the remagnetization loop of a sample in the technical saturation mode and with an accuracy worse than 1°. When testing magnetically soft materials in weak fields this disadvantage results in a limited accuracy, speed of action and reproducability of measurements by means of oscilloscopic ferrometers, whereas in testing magnetically hard materials in strong fields this results in still greater additional error due to a rapid heating of a sample with eddy currents, as well as in an increased power consumption, especially when testing magnetically superhard materials in fields of an intensity exceeding 20 kErgs.

It is a object of the invention to provide an oscilloscopic ferrometer which permits effecting remagnetization of a sample in a source of uniform magnetic field having air gaps, in which the uniformity of field is such as to reduce to nil to coefficient of the second power term of the expansion series of the axial component of the field by powers of the axial coordinate.

Another object of the invention is to provide an oscilloscopic ferrometer which has an elevated sensitivity and accuracy of measurements in testing materials having a square hysteresis loop by attenuating parasitic oscillations in the measuring coil and by reducing the compensation error caused by non-linear distorsions of magnetizing current.

Still another object of the invention is to provide a ferrometer which ensures the measurement of instant values of J and H at an arbitrarily chosen point of the remagnetization cycle to compute the differential permeability or susceptibility as a quotient from the division of a signal $dB/dt$ by $dH/dt$.

A further object of the invention is to provide the automation of the process of measurement of total electromagnetic losses with the reading from digital calibrators and the increase in coefficient of utilization of the oscilloscope screen by shaping an image of marked calibrated axes.

The invention substantially consists of the fact that in an oscilloscopic ferrometer comprising a magnetizing means including a stepdown transformer having a single-turn secondary winding and an ellipsoidal solenoid having uniform pitch of hollow turns along the generatrix provided with a circulatory cooling, a measuring magnetization channel having a measuring coil and a current compensation coil, a measuring channel for magnetizing field having a field intensity sensor and a circuit for measuring the parameters of a dynamic loop having a cathode-ray tube, according to the invention, the magnetizing means comprises at least two identical solenoids which are arranged coaxially relative to each other with air gaps therebetween, the geometrical dimensions of each solenoid being selected on the basis of the following relationship therebetween and the dependence on the amount of the air gap:

$$\frac{R_L}{L} = -0.1368K^3 + 0.0822K^2 + 0.7168K + 0.007$$

$$K = 1.108 \left(\frac{1}{L}\right) 0.6415 \qquad \Big| K\epsilon 0.1 + 0.9$$

wherein
$R_L$ is radius of the effective opening of the ellipsoidal solenoids;
$L$ is equal to one-half of the length of the ellipsoidal solenoid;
$l$ is size of the air gap between the ellipsoidal solenoids;
$K$ is a coefficient of constriction of the generatrix of the solenoid,
the symbol $\epsilon$ indicates that $K$ belongs to the set of $0.1 + 0.9$, one measuring coil of the channel for magnetization being located in the central zone of the air gap, the current compensation coil of this channel being disposed coaxially with the solenoid, and current leads establishing the aiding-series connection between the ellipsoidal solenoids and constituting an integral part of the single-turn winding of the stepdown transformer comprises coaxial cylindrical bodies whose ends are interconnected by means of water supply manifolds.

The compensation system of each measuring coil preferably comprises a second current compensation coil linked with the magnetic flux of the solenoids, and one potential compensation coil linked with the magnetic flux of the core of the step-down transformer, each current measuring coil being coaxially located with respect to a corresponding solenoid at a distance of one-fourth of the solenoid length from the right-hand end thereof for the right-hand winding and having a length smaller than one-twelfth of the solenoid length, one of the current coils being connected in series-opposition, via an amplitudephase corrector of the first harmonic, to the potential compensation coil, and the other coil being connected in series-opposition, via an amplitude-phase corrector of higher harmonics, to the measuring coil of the measuring coil of the measuring channel for magnetization.

In addition, in this oscilloscopic ferrometer each measuring coil of the measuring channel for magnetization may be embraced by a short-circuited screen made of a non-magnetic material having a high electric conductance, and the ratio of the screen length to the measuring coil length should be at least equal to 1.2.

It is advantageous that in an oscilloscopic ferrometer comprising a series circuit of an integrator and a phase corrector in each measuring channel, as well as calibrators, the circuit for measuring the parameters of dynamic remagnetization loop comprises a gate converter having an input connected to the output of the phase corrector of the channel for magnetizing field and inputs connected to the control electrode of the cathode-ray tube, a converter of instant values of current and intensity into DC voltage having an input connected to the outputs of the phase correctors of the channels for magnetization and the magnetizing field, as well as to the output of the gate converter, and outputs connected to calibrators responsive to the polarity of the signal being measured, a unit for computation of the differential magnetic permeability or susceptibility having inputs connected in parallel with the input of the integrator of the channel for the magnetizing field and to the input of the channel for magnetization, as well as to the output of the gate converter, a unit for computation of total electromagnetic losses having input connected to the inputs and outputs of the channels for magnetization and for magnetizing field, a unit for shaping an image of scale-marked coordinate axes of magnetization and intensity having inputs connected to the output of the phase corrector of the channel for magnetization and to the output of the channel for magnetizing field, and an output connected to the plates of the cathode-ray tubes via an autoswitch having an input connected to the output of the phase corrector of the channel for magnetization, the outputs of the unit for computation of the differential magnetic permeability or susceptibility and of the unit for computation of total electromagnetic losses being coupled to respective calibrators.

In the oscilloscopic ferrometer, the gate converter preferably comprises a series circuit including a converter of sinusoidal pulse into square pulses having the same period, a flip-flop for division of square pulse repetition rate by two, a monostable multivibrator with a variable time delay from nil to the value of the field period, a monostable multivibrator for shaping a square gate pulse and an inverting amplifier having an output connected to the control electrode.

It is expedient to provide the unit for computation of the differential magnetic permeability or susceptibility with amplitude modulators for the magnetizing field and magnetization, amplitude detectors for the magnetizing field and magnetization having their inputs connected to the outputs of respective amplitude modulators, a key connected to the output of the amplitude detector for magnetization, a voltage time period converter connected to the key, a flip-flop having one input connected to the voltage converter and the other input connected to a timing-pulse generator, the output of the flip-flop being connected to the key, an amplitude modulator having inputs connected to the input of the flip-flop and to the output of the amplitude detector for magnetization, and an output connected to the input of the calibrator via a filtering circuit.

The unit for computation of total electromagnetic losses may comprise an adder circuit, a squarer connected thereto, a subtractor, a squarer connected thereto, a substractor circuit having an input connected to the outputs of both squarers, and an integrator having an input connected to the subtractor circuit and an output connected to the calibrator.

The unit for shaping an image of scale-marked coordinate axes may comprise a scale-marking pulse generator coupled to the output of the phase corrector of the channel for magnetizing field, a sawtooth generator, at least two frequency dividers connected in series, the input of the first of the frequency dividers being connected to the output of the scale-marking pulse generator and the output of the last one of the dividers being connected to the input of the sawtooth generator, comparison circuits having their inputs connected to the outputs of the phase correctors and to the output of the sawtooth generator, a first group of coincidence circuits having certain inputs thereof connected to the outputs of respective comparison circuits, a flip-flop coupled to the control inputs of the coincidence circuits of the first group and to the last frequency divider, keys having their inputs connected to the outputs of the coincidence circuits of the first group and outputs connected to the input of an autoswitch, and a second group of coincidence circuits each having outputs connected to the flip-flop, to the output of the scale-marking pulse generator and to the output of the first frequency divider, the outputs of these coincidence circuits being connected to the inputs of the autoswitch.

It has been found to be most advantageous for the oscilloscopic ferrometer to have a phase correction monitoring unit comprising a two positional switch and a mixer for triangular pulses and scale-marking pulses having inputs connected to the output of the scale-marking pulse generator and to any desired number of the dividers of the unit for shaping an image of scale-marked coordinate axes and an output alternately connectible, via the contacts of the two positional switch, to the phase correctors of the measuring channels for magnetization and magnetizing field, respectively, while the timed contacts of a two positional switch connect the inputs of the integrators to the flip-flop of the unit for shaping scale-marked coordinate axes in such a manner that, upon connecting the output of the mixer with the phase corrector of the channel for magnetizing field, the flip-flop is connected to the input of the integrator of the channel for magnetization, and, upon connecting the output of the mixer to the phase corrector of the channel for magnetization, the flip-flop is connected to the input of the integrator of the channel for the magnetizing field.

Other objects and advantages of the present invention will become apparent from the following description of specific embodiments thereof illustrated in the accompanying drawings, in which.

The oscilloscopic ferrometer according to the invention comprises a magnetizing means, measuring channels for magnetization and magnetizing field, and a circuit for measuring the parameters of a dynamic remagnetization loop.

The magnetizing means of the ferrometer comprises a group of identical single-layer ellipsoidal solenoids 1 and 2 (FIG. 1) which are wound with a tubular conductor with uniform pitch of turns 3 along a generatrix 4 and inserted in series in a single-turn secondary winding 5 of a stepdown toroidal transformer 6. The ellipsoidal solenoids 1 and 2 are arranged coaxially relative to each other with an air gap between their ends.

Figure 1:
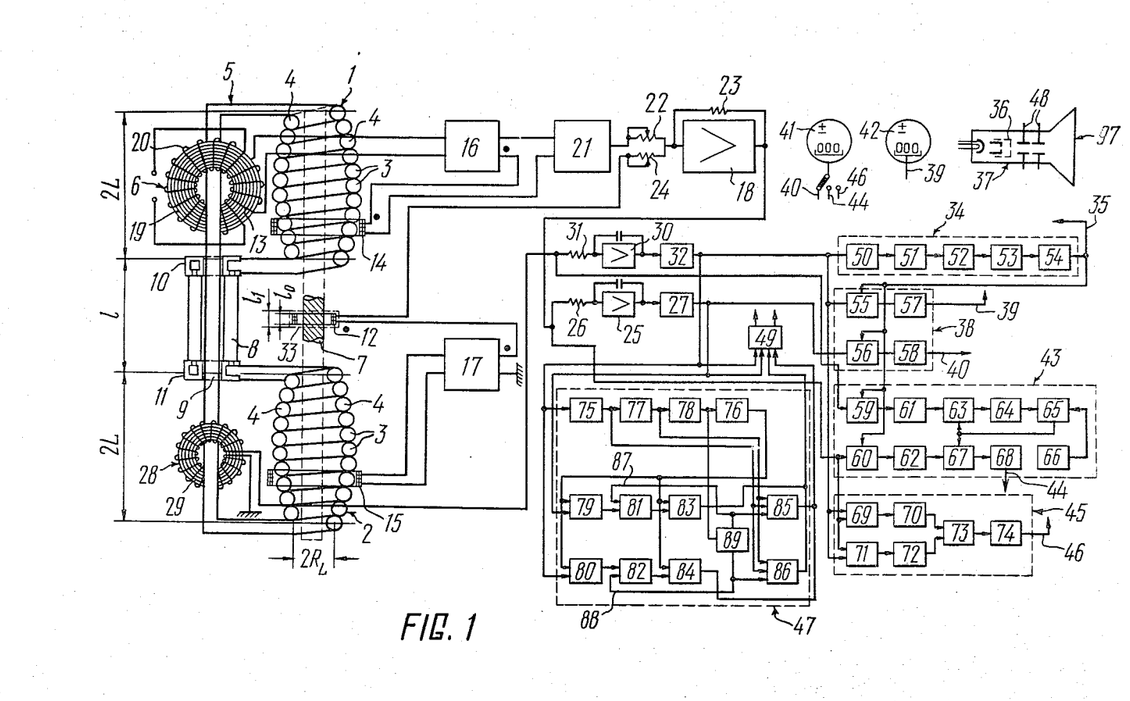
FIG. 1 is a circuit diagram of the oscilloscopic ferrometer according to the invention.

While FIG. 1 shows only two solenoids for the sake of simplicity, their number may be greater and depends on the length of a sample 7 to be tested which is placed inside the solenoids 1 and 2.

The ellipsoidal solenoids 1 and 2 are wound in such a manner that their geometric dimensions are in the following relationship therebetween and with the amount of the air gap between the solenoids:

$$\frac{R_L}{L} = -0.1368K^3 + 0.0822K^2 + 0.7168K + 0.007$$

$$K = 1.108\left(\frac{1}{L}\right)0.6415 \qquad K\epsilon 0.1 \div 0.9$$

wherein
- $R_L$ is radius of the effective opening of the ellipsoidal solenoids 1 and 2;
- $L$ is equal to one-half of the length of the ellipsoidal solenoid (1 or 2);
- $l$ is the size of the air gap between the ellipsoidal solenoids 1 and 2;
- $k$ is a coefficient of constriction of the generatrix 4 of the solenoid 1 (2).
- the symbol $\epsilon$ indicates that $K$ belongs to the set of $0.1 \div 0.9$, A direct current lead 8 and return current lead 9 establishing an aiding-series connection between the solenoids 1 and 2 and constituting an integral part of the single turn secondary winding 5 comprise hollow coaxial cylindrical bodies whose ends are interconnected by means of water supply manifolds 10 and 11. It should be noted that the return current lead 9 is disposed inside the direct current lead 8. The turns 3 of the solenoids 1 and 2, as well as the secondary winding 5 and the coaxial cylindrical bodies are cooled with circulating water.

Mounted coaxially with the sample 7 being tested in the air gap between the solenoids 1 and 2 is a magnetization sensor comprising a measuring coil 12 connected in series-opposition to a compensation system including a potential compensation coil 13 and current compensation coils 14 and 15, amplitudephase correctors 16 and 17 and an adder 18.

The potential compensation coil 13 in mounted on the same core 19, which supports a power winding 20 of the transformer 6, and is connected to the amplitude-phase corrector 16 of the first harmonic.

The current compensation coils 14 and 15 are linked with the magnetic flux of the solenoids, each coil is coaxial with the solenoids 1 and 2 and has one and the same constant ws. These coils are located at a distance of one-fourth of the solenoid axis length from the right-hand side thereof for the right-hand winding and have a length smaller than one-twelfth of the solenoid axis length.

The current compensation coil 14 is connected in series-opposition to the potential compensation coil 13 via the amplitude-phase corrector 16 of the first harmonic, and the current compensation coil 15 is connected in series-opposition to the measuring coil 12 via the amplitude-phase corrector 17 of higher harmonics.

The output of the amplitude-phase corrector 16 is connected, via a phase corrector 21, to an input resistor 22 of the adder 18 having a feedback circuit including a resistor 23. Another input resistor 24 of the adder 18 is connected to the measuring coil 12.

The measuring channel for magnetization comprises a measuring coil 12 located in the air gap between the solenoids 1 and 2, an integrator 25 having an input transistor 26 which is connected, via the adder 18, to the measuring coil 12, and a phase corrector 27 connected to the output of the integrator 25. The output of the phase corrector 27 represents the output of the measuring channel for magnetization.

The measuring channel for the magnetization field comprises a field intensity sensor in the form of a toroidal coil 28 supported on a non-magnetic core 29 and mounted coaxially with the secondary winding 5.

The channel for the magnetizing field also comprises an integrator 30 having an input resistor 31 connected to the coil 28, the output of the integrator being connected to a phase corrector 32 whose output represents the output of the channel for magnetizing field.

In order to ensure the complete dampening of parasitic oscillations without distorting the shape of the signals, as well as to improve the sensitivity of the magnetization sensor, its measuring coil 12 is embraced by a short-circuited screen 33 made of a non-magnetic material having a high electric conductance. The ratio of length $l_1$ of the screen 33 to the length $l_o$ of the measuring coil 12 should be equal to at least 1.2.

In accordance with the invention, the circuit for measuring the parameters of the dynamic remagnetization loop comprises a gate converter 34 having an input connected to the output of the phase corrector 32 is the channel for the remagnetizing field and an output connected, via a conductor 35, to a control electrode 36 of a cathode-ray tube 37. The output of the gate converter 34 is connected to a converter 38 of instant values of current and intensity into DC voltage, said converter having outputs connected, via conductors 39 and 40, to calibrators 41 and 42 responsive to the polarity of the signal being measured.

The circuit for measuring the parameters also comprises a unit 43 for computation of the differential magnetic permeability or susceptibility having inputs connected in parallel with the inputs of the integrators 25 and 30 of the measuring channels and an output connected, via a conductor 44, to the calibrator 41, and a unit 45 for computation of total electromagnetic losses having inputs connected to the inputs and outputs of the measuring channels and an output connected to the calibrator 41 via a conductor 46.

The circuit for measuring the parameters also comprises a unit 47 for shaping an image of scale-marked coordinate axes of magnetization and intensity having inputs connected to the outputs of the measuring channels and an output connected to deflecting plates 48 of the cathode-ray tube 37 via an autoswitch 49. The inputs of the autoswitch 49 are connected to the outputs of the phase correctors 27 and 32.

The gate converter 34 comprises a series circuit including a converter 50 of sinusoidal signal into square pulse of the same period as that of the sinusoidal signal, a flip-flop 51 for division of the square pulse repetition rate by two, a monostable multivibrator 52 with a variable time delay from nil to $T$, wherein $T$ is period of field, connected to a monostable multivibrator 53 shaping square gate pulse to be fed, via an inverting amplifier 54, to the control electrode of the cathode-ray tube 37.

The converter 38 comprises amplitude modulators 55 and 56 corresponding to the measuring channels for magnetization and magnetizating field, which are connected to the amplifier 54 and controlled by the gate pulses applied from the output of the amplifier 54, and the outputs of the modulators 55 and 56 are connected to amplitude detectors 57 and 58 connected to the calibrators 41 and 42, respectively, graduated in the scale units of magnetization and magnetizing field, respectively.

The unit 43 for computation of the differential magnetic permeability or susceptibility comprises amplitude modulators 59 and 60 for magnetization and magnetizing field corresponding to the measuring channels for magnetization and magnetizing field and controlled by the gate pulse applied from the output of the amplifier 54.

The outputs of the modulators 59 and 60 are connected to the inputs of respective amplitude detectors 61 and 62 for the magnetization and magnetizing field, of which the first detector 61 is connected to a key 63 having an output connected to a voltage/time period converter 64. The output of the converter 64 is connected to an input of a flip-flop 65 having another input connected to a timing pulse generator 66, and the output of the flip-flop 65 is connected to the control inputs of the key 63 and to an input of an amplitude modulator 67 having another input connected to the output of the amplitude detector 62.

The output of the amplitude modulator 67 is connected, via a filtering circuit 68, to the calibrator 41 having one of the scales thereof graduated in the scale units of magnetic permeability $\mu_d$.

The unit 45 comprises an adder circuit 69 having a squarer 70 at the output thereof and a subtractor 71 having a squarer 72 at the output thereof which are connected to the inputs of a subtractor circuit 73 having an output connected to an integrator 74 whose output is connected to the input of the calibrator 41 graduated in the scale units of total losses.

The unit 47 for shaping an image of scale-marked coordinate axes of magnetization and intensity, according to the invention, comprises a scale-marking pulse generator 75 having an input connected to the output of the phase corrector 32 of the channel for magnetizing field. The unit 47 also includes a sawtooth generator 76 and two decimal frequency dividers 77 and 78 connected in series. The number of the dividers may be increased and depends on a desired scale of the coordinate axes and accuracy of measurement of the parameters.

An input of the first divider 77 is connected to the output of the scale-marking pulse generator 75, and an output of the second divider 78 is connected to the input of the sawtooth generator 76.

The unit 47 also comprises comparison circuits 79 and 80 having their inputs connected to the outputs of the phase correctors 27 and 32, respectively, and to the output of the sawtooth generator 76, a first group of coincidence circuits 81 and 82, keys 83 and 84 and a second group of coincidence circuits 85 and 86.

An input of the coincidence circuit 81 is connected to the output of the comparison circuit 79, an input of the coincidence circuit 80 is connected to the output of the comparison circuit 80, and the control inputs thereof 87 and 88 are connected to a flip-flop 89 which is, in turn, coupled to the output of the second divider 78. The inputs of the coincidence circuits 81 and 82 are connected to the inputs of the respective keys 83 and 84, while the outputs of the keys 83 and 84 are connected to the autoswitch 49.

The inputs of each of the coincidence circuits 85 and 86 of the second group are connected to the flip-flop 89, to the output of the scale-marking pulse generator 75 and to the output of the first frequency divider 77, and the outputs of these circuits 85 and 86 are connected to the inputs of the autoswitch 49. The outputs of the autoswitch 49 are connected to the deflecting plates 48 of the cathode-ray tube 37.

Figure 2:
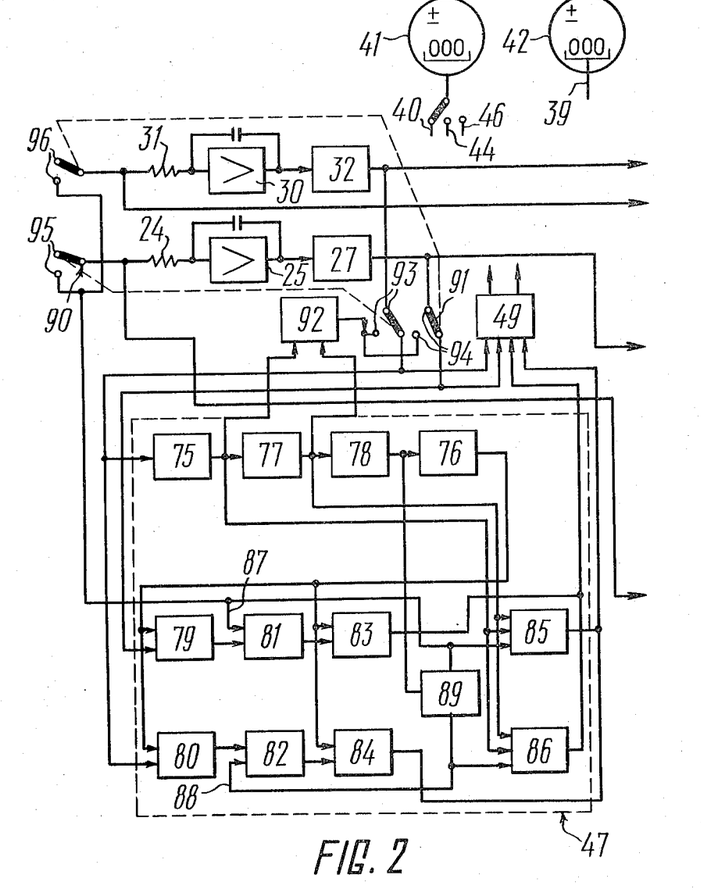
FIG. 2 is a block-diagram of the phase correction monitoring unit according to the invention.

FIG. 2 shows the phase correction monitoring unit comprising a pair of two positional switches 90 and 91 and a mixer 92 for triangular pulses and scale-marking pulses.

Inputs of the mixer 92 are connected to the output of the scale-marking pulse generator 75 and to any desired number of dividers 77 and 78. In the example described herein, the mixer 92 is connected to the divider 77. The output of the mixer 92 is connected, via contacts 93 of the switch 91, to the phase corrector 32 of the channel for the magnetizing field, and, via contacts 94 of the switch 91, to the phase corrector 27 of the channel for magnetization. Thus, the switch 90 operating in a timed relation with the switch 91 will connect the inputs of the integrator 25 to the flip-flop 89 via timed contacts 95, when the mixer 92 is connected to the phase corrector 32, and the inputs of the integrator 30 are connected to the flip-flop 89, via timed contacts 96, when the mixer 92 is connected to the phase corrector 27.

A toroidal coil 28 of the field intensity sensor is connected to the input of the integrator 30 via the contacts of the switch 90.

The oscilloscopic ferrometer operates in the following manner.

The axial component of the magnetic field in the central zone of the air gap between the solenoids 1 and 2 is defined as:

$$H_x = 2\pi j_s \int \left(2L + \frac{1}{2}\right) \left[\frac{\sin^2 \psi}{\rho_0} P_1' \cos\psi + \frac{\sin^2(\pi-\psi)}{-\left(2L + \frac{\rho}{2}\right)} P_1' \cos(\pi-\psi),\right] ds = 2\pi j_s G$$

wherein
$j_s$ is ampereturns density along the generatrix 4;
$\psi$ is the azimuthal angle of an elementary circuit;
$P$ are Legendre polynoms,
$\rho_0$ is the radius vector of an elementary circuit.

The function $G$ which is a combination of higher transcendental functions and elementary functions cannot be expressed in a finite form.

The expansion of the dimensionless function $G$ into the McLoren series by powers of the axial coordinate X and calculations on a digital computer have permitted finding the above-specified relationships between $k$, $R_L L$ and $l$ at which the coefficient of the term $X^2$ in the expansion series $$G = G(0) + G''(0) \frac{X^2}{2!} + G^{IV}(0) \frac{X^4}{4!} +$$

is reduced to nil.

Figure 3:
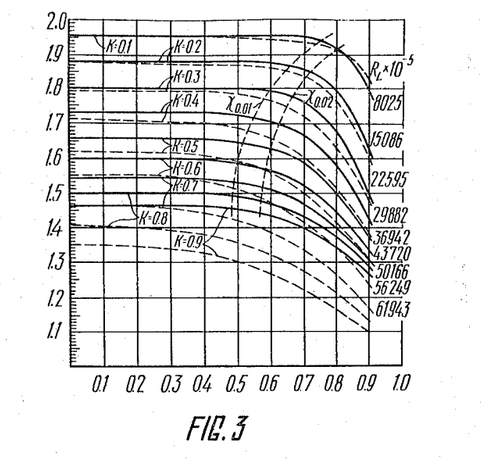
FIG. 3 is a graph illustrating the distribution of the axial component of magnetizing field in the ellipsoidal solenoids.

FIG. 3 shows the distribution of the axial component of field in the ellipsoidal solenoids according to the invention (solid curves 97) and in known solenoids (dotted curves 98) which is based on the selection of the values complying with a predetermined deviation of the field. As is clearly shown by these curves, the solenoids according to the invention having the above-specified dimensional proportioning ensure a considerable increase in the value and uniformity of the field.

Therefore, the field in the air gaps is identical to the field in the central zone of the solenoids, and the field components at the level $R_L$ do not substantially differ from similar components along the axis of symmetry, as it generally occurs in ellipsoidal solenoids.

Figure 4:
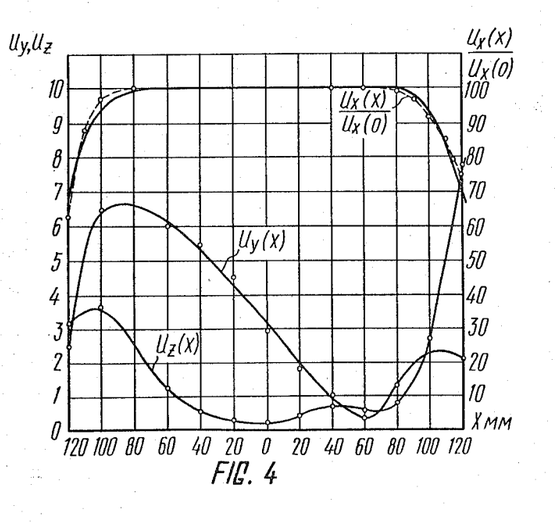
FIG. 4 is a graph illustrating the distribution of the axial components components and radial components of the magnetic field the ellipsoidal solenoid along the longitudinal axis thereof.

FIG. 4 shows an example of distribution of the axial component $(U_x(x)/U_x(0))$ and radial components of magnetic field $(U_y(x)$ and $U_z(x))$ along the longitudinal axis of the ellipsoidal solenoid. This graph shows that the radial components are at their manifest minimum at the point $x=60$ (for the right-hand winding) at the portion extending through about one-twelfth of the solenoid length. These particular points are preferably used to locate the current compensation coils.

In testing the sample 7, especially one having a square hysterisis loop and a wide spectrum of higher magnetization harmonics, damped parasitic high-frequency oscillations appear in a parasitic resonance circuit formed by the interturn capacitance of the measuring coil 12 and dissipation inductance which distort the shape of the remagnetization loop. Eddy currents induced in the short-circuited screen 33 impair the Q of the resonance circuit to interrupt the oscillating process. With the ratio between the lengths of the screen 33 and coil 12 $l_1/l_0 = 1.2$ parasitic oscillations are interrupted over a wider frequency range, and no distortions of the signal shape $U_{10} = kw_{10}s_0 \, dJ/dt$ are introduced. This permits increase of the constant ws of the magnetization sensor by at least two orders.

From EMF of the measuring coil 12
$$E_{10}(\omega t) = E_{1m_{10}} \sin(\omega t + \phi_1) + E_{3m_{10}} \sin(3\omega t + \phi_3)$$
(higher harmonics are ignored) there is subtracted the EMF of the current compensation coil 15 corrected by the phase and amplitude of the first harmonic so that
$$E_{12}(\omega t) - E_{15}(\omega t) = E_{3m_{15}}(3\omega t = \phi_{3_{15}}),$$
From the EMF of the potential compensation coil 13 $E_{13}(\omega t)$ having negligibly small higher harmonics in the mode of sinusoidal voltage there is subtracted a signal of the second current compensation coil 14 corrected by the amplitude and phase of the first harmonic so that
$$E_{13}(\omega t) - t_{14}(\omega t) = E_{3m_{13-14}} \sin(3\omega t + \phi_{3_{13-14}}),$$
and after the correction by phase of the third harmonic $\phi_{3_{13-14}} = \phi_{3_{16}}$, a signal from the phase corrector 21 $E_{21} = E_{3m_{21}}\sin(3\omega t = \phi_{3_{21}})$ is added to the difference signal
$$E_{12}(\omega t) - E_{16}(\omega t) = E_{3m_{16}}\sin(3\omega t + \phi_3)$$
applied in antiphase relation to the adder 18 having the resistors 22 and 24 of $R_1$ and $R_2$, respectively, selected so that $$E_{21} \left(\frac{R_1}{R}\right) = (E_{12} - E_{16}) \left(\frac{R_2}{R}\right)$$

and the signal at the output of the adder 18 in the absence of the sample 7 in the coil is nil, while upon the insertion of the sample 7 $E_{18} = kw_{12} S_o (dI/dt)$, wherein $k$ is a constant coefficient.

Due to the arrangement of the current compensation coils 14 and 15 at a distance of one-fourth of the length of the solenoid 1 (2) from the right-hand end for the right-hand winding, where the minimum of the radial field, components $H_y$ and $H_z$ occurs as shown in FIG. 4, the requirements imposed on the accuracy of positioning of the coils 14 and 15 coaxially with the solenoids 1 and 2 are considerably less stringent.

An integrated and phase-corrected signal from the field intensity sensor is fed to the converter 50, and square pulses from the output of this converter set the flip-flop 51 and then the monostable multivibrator 52 generating square pulses of a preset length which are used to set the monostable multivibrator 53 with their trailing edge. Square gate pulses are shaped at the output of the monostable multivibrator 53 having a length which is much more shorter than the field period. The gate pulse applied to the control electrode 36 of the cathode-ray tube 37 fixes the observation point of the remagnetization loop with a brightness mark induced on the screen 97 of the tube 37 upon feeding signals $J(t)$ and $H(t)$ from the outputs of the integrators 25 and 30, respectively, via the autoswitch 49 to the plates 48 of the tube 37. Therefore, the parameters J and H at the loop point fixed with the brightness mark are read from the calibrators 41 and 42, and for that purpose the signals $J(t)$ and $H(t)$ are fed to the amplitude modulators 55 and 56 of the unit 38 which are controlled by said gate pulse and are detected by the detectors 57 and 58 to be fed from the outputs thereof to the calibrators 41 and 42 via the conductors 39 and 40.

Concurrently, the signals $dJ/dt$ and $dB/dt$ from the field intensity sensor and from the measuring coil 12 are fed to the inputs of the amplitude modulators 59 and 60 controlled by the same gate pulse and are detected by the amplitude detectors 61 and 62.

The differential magnetic permeability or susceptibility $\chi d$ is the ratio $dJ/dt$, and for determination of $\chi_d$ in the ferrometer herein described, the division of voltages corresponding to the values $dJ/dt$ and $dH/dt$ is effected in the unit 43, that is $$\frac{U(dJ/dt)}{U(dH/dt)} = \frac{dJ}{dH} = \chi_d.$$

For this purpose, the timing pulse generator 66 generating square pulses of the period T sets the flip-flop 65 to make the key 63 and the amplitude modulator 67 conductive. The converter 64 receives the signal from the detector 61 of the channel for magnetization to convert it into the time period $$t_H = \frac{1}{U(dH/dt)}$$

at the end of which the converter 64 generates a short pulse to reset the flip-flop 65 so as to block the key 63 and the amplitude modulator 67. Then the division cycle is repeated. The pulse train of the length $t_H$ and period $T$ at the output of the amplitude modulator 67 will have the amplitude $U(dJ/dt)$, and it is known that its mean value is $$U_m = U(dJ/dt)\, tk \cdot \frac{1}{T}$$

$$U_m = k_\mu \frac{U(dJ/dt)}{U(dH/dt)}$$

$$U_m = k_\mu \frac{dJ}{dH} = \mu d,$$

wherein $k_\mu$ is scale factor. The signal from the filtering circuit 68 is fed to the calibrator 41.

For accurate measurement of remanence $J_r$ or $B_r$, the autoswitch 49 switches over the phase of the signal H at time intervals equal to the period of the magnetizing field frequency so that a combination of image of remagnetization loop and the mirror reflection thereof with respect to the axis J is displayed on the screen 97 of the cathode-ray tube 37. The brightness mark is fixed at the points of the intersection of branches of these loops, and $J_r$ is read from the calibrator 41. At the same time, demagnetization of the samples being tested is checked-up as to the symmetry of the differential susceptibility in the centrally symmetric points of the loop with respect to the axis H.

In order to compute total losses, the signals $dJ/dt$ or $dB/dt$ and $H(t)$ are fed to the inputs of the subtractor 71 and the adder circuit 69 of the unit 45 to effect the following operation at the output of the circuit 73 of this unit:

$$(dJ + H)^2 - (dJ - H)^2 = 4HdJ$$

and at the output of the integrator 74 there appears a signal $$U_{34} = 4 \int_o^T HdJ = K_p\, P_{rB}$$

wherein $k$ is scale factor of losses.

By using the unit 45 for computation of losses, the ferrometer is attested with a reference sample as to total losses $P_{rB}$ in the saturation mode $J_m$ upon reaching a constant level of the losses reading from the calibrator 41.

In so doing, the brightness mark is brought to the loop apex, and the calibrator 41 is graduated with the value of $J_m$.

In order to have direct recording of the tests by displaying the image of remagnetization loop, as well as to reduce the reading errors due to non-linear distortions caused by the cathode-ray tube 37 to thereby increase the utilization factor of the screen 97, the ferrometer incorporates the unit 47 for shaping an image of scale-marked coordinate axes of magnetization and intensity which operates in the following manner.

The scale-marking pulse generator 75 which is synchronized with the magnetization signal H whose frequency is divided twice, e.g., in the ratio 1:10 by the dividers 77 and 78, presets the length of the sawtooth pulses shaped by the generator 76.

The amplitude of the sawtooth voltage from the generator 76 is limited to the values equal to the amplitudes of the signals $H_m$ and $J_m$ by means of the comparison circuits 79 and 80 generating the signals which make the keys 83 and 84 conductive every second period via the coincidence circuits 81 and 82, the other inputs of the coincidence circuits receiving timing amplitude signals from the flip-flop 89 controlled by the signals from the divider 78. The sawtooth signals from the keys 83 and 84 having the amplitudes $H_m$ and $J_m$ are fed to the autoswitch 49 which feeds these signals to the plates 48 every second period of magnetizing field alternating them with the signals $H(t)$ and $J(t)$.

The superposition of the scale-marking pulses from the generator 75 and from the divider 77 forms scale pulses which are fed via the coincidence circuits 85 and 86 to the deflecting plates 48 at the timing intervals between the feeding of the sawtooth voltages, whereby uniform glow of the image of loop, axes and decimal marks is ensured.

The phase correction monitoring unit comprising the switches 90 and 91 of the contact or mechanical type, and the mixer 92 operates as follows. During the check-up operation the timed contacts of the switch 90 interconnected with a dotted line in FIG. 2 disconnect the respective channel from the sensor J or H and connect the output of the flip-flop 89 to the input of the integrator 30 or 25, while the output of the mixer 92 for decimal mark signals is connected to the output of the other channel.

The leading and trailing edges of the triangular pulse at the output of the integrator 30 (25) obtained as a result of the integration of the square pulse receiver at the input of this integrator form on the screen 97 a fused line on which the decimal marks coincide with each other if there are no phase distortions in the channel.

This construction, apart from an increased accuracy and speed of action as compared with the known ferrometer, also permits continuous monitoring of the phase correction by superposing on the screen of the cathode-ray tube the image of the sample loop and combined marked edges of the check-up pulse by means of a switch.

What is claimed is:

1. An oscilloscopic ferrometer comprising: a magnetizing means; a measuring channel for magnetization interrelated with said magnetizing means; a measuring channel for a magnetizing field interrelated with said magnetizing means; a circuit for measuring the parameters of a dynamic remagnetization loop of a sample being tested; said magnetizing means comprising: a step-down transformer; a core of said stepdown transformer; a single-turn secondary winding of said step-down transformer; at least two identical ellipsoidal solenoids connected to said secondary winding, said solenoids being coaxially arranged relative to each other with an air gap therebetween and each having hollow turns with uniform pitch along the generatrix; a direct current lead and a return current lead establishing an aiding-series connection between said ellipsoidal solenoids, said current leads constituting an integral part of said single-turn secondary winding; said current leads comprising hollow coaxial cylindrical bodies; said return current lead extending inside and direct current lead; manifolds connected to said coaxial cylindrical bodies; cooling fluid flowing through the hollow turns of said ellipsoidal solenoids, said secondary winding and said manifolds; said measuring channel for magnetization comprising: a measuring coil located in the central zone of said air gap; a compensation coil coaxially disposed with respect to said current lead of the secondary winding; a field intensity sensor of said measuring channel for magnetizing field; a cathode-ray tube having a control electrode and deflecting plates to fix an image of the dynamic remagnetization loop of the sample being tested placed inside said ellipsoidal solenoids which create a uniform magnetic field so that the intensity of this field and magnetization of said sample are converted in said measuring channels into electric signals fed to the electrodes of said cathode-ray tube; the geometric dimensions of said ellipsoidal solenoids being selected on the basis of the following relationship therebetween and the dependence on the size of said air gap:

$$\frac{R_L}{L} = -0.1368K^3 + 0.0822K^2 + 0.7168K + 0.007$$

$$K = 1.108 \left(\frac{l}{L}\right) 0.6415$$

$$K \epsilon\ 0.1 \div 0.9$$

wherein $R_L$ is the radius of the effective opening of said ellipsoidal solenoids;

$L$ is equal to one-half of the length of said ellipsoidal solenoid;

$l$ is the size of said air gap between said solenoids, $k$ is a coefficient of constriction of the generatrix of said solenoid, the symbol $\epsilon$ indicates that $K$ belongs to the set of $0.1 \div 0.9$.

2. An oscilloscopic ferrometer comprising: a magnetizing means; a measuring channel for magnetization interrelated with said magnetizing means; a measuring channel for a magnetizing field interrelated with said magnetizing means; a circuit for measuring the parameters of a dynamic remagnetization loop of a sample being tested; said magnetizing means comprising: a stepdown transformer; a core of said stepdown transformer; a single-turn secondary winding of said stepdown transformer; at least two identical ellipsoidal solenoids, said solenoids being connected to said secondary winding, coaxially arranged relative to each other with an airgap therebetween and each having hollow turns with uniform pitch along the generatrix; a direct current lead and a return current lead, said current leads establishing an aiding-series connection between said ellipsoidal solenoids and constituting an integral part of said single-turn secondary winding; said current leads comprising coaxial hollow cylindrical bodies; said return current lead extending inside said direct current lead; manifolds connected to said coaxial cylindrical bodies; colling fluid flowing through the hollow turns of said ellipsoidal solenoids, said secondary winding and said manifolds; said measuring channel for magnetization comprising a measuring coil located in the central zone of said air gap, a compensation coil arranged coaxially with respect to said current lead of the secondary winding; a compensation system of said measuring coil comprising two current compensation coils, each compensation coils being disposed coaxially with respect to said respective solenoid at a distance of one-fourth of the solenoid length from the right-hand end thereof for the right-hand winding and having a length smaller than one-twelfth of the solenoid length; a potential compensation coil comprising said compensation coil of the measuring channel for magnetization which is linked with the magnetic flux of said core of the stepdown transformer; an amplitude-phase corrector of the first harmonic having an input and an output; the input of said amplitude-phase corrector of the first harmonic having an input and an output, the input of said amplitude-phase corrector being connected to said potential compensation coil and said output is connected to said first current compensation coil in series-opposition with said first current coil; an amplitude-phase corrector of higher harmonic having an input and an output; the input of said corrector of higher harmonics being connected to said second current coil, and said output thereof is connected in series-opposition to said measuring coil of the measuring channel for magnetization; a field intensity sensor of said measuring channel for magnetizing field; a cathode-ray tube of said circuit for measuring the parameters to fix an image of the dynamic remagnetization loop of the sample being tested accommodated inside said ellipsoidal solenoids which create uniform magnetic field so that the intensity of this field and magnetization of said sample are converted into electric signals in said measuring channels to be fed to the electrodes of said cathode-ray tube, the geometric dimensions of said ellipsoidal solenoids being selected on the basis of the following relationship therebetween and the dependence on the size of said air gap:

$$\frac{R_L}{L} = -0.1368K^3 + 0.0822K^2 + 0.7168K + 0.007$$

$$K = 1.108 \left(\frac{l}{L}\right) 0.6415$$

$$K \epsilon\ 0.1 \div 0.9$$

wherein $R_L$ is the radius of the effective opening of said ellipsoidal solenoids;

$L$ is equal to one-half of the length of said ellipsoidal solenoid;

$l$ is the size of said air gap between said solenoids;

$k$ is a coefficient of constriction of the generatrix of said solenoid, the symbol $\epsilon$ indicates that $K$ belongs to the set of $0.1 \div 0.9$.

3. An oscilloscopic ferrometer according to claim 1, comprising a short-circuited screen made of a nonmagnetic material having a high electric conductance, said screen embracing each said measuring coil of the measuring channel for magnetization; the ratio of the length of said screen to the length of said measuring coil being equal to at least 1.2.

4. An oscilloscopic ferrometer according to claim 2, comprising a short-circuited screen made of a nonmagnetic material having a high electric conductance, said screen embracing each said measuring coil of the measuring channel for magnetization; the ratio of the length of said screen to the length of said measuring coil being equal to at least 1.2.

5. An oscilloscopic ferrometer according to claim 2, comprising two integrators, each inserted in each of said measuring channels; two phase correctors each connected to the respective one of said integrators; calibrators responsive to the polarity of the signal being measured; said circuit for measuring the parameters of dynamic remagnetization loop including:

a gate converter having an input and an output; the input of said gate converter being connected to the output of said phase corrector of the channel for the magnetizing field; the output of said gate converter being connected to said control electrode of the cathode-ray tube;

a converter of instant values of current and intensity into DC voltage having inputs and outputs; the inputs of said instant value converter being connected to the output of said gate converter and to the outputs of said phase correctors; the outputs of said instant value converter being connected to said calibrators;

a unit for computation of the differential magnetic permeability or susceptibility having inputs and outputs; the inputs of said unit for computation of the differential magnetic permeability or susceptibility being connected in parallel with the inputs of said integrator of the channel for the magnetizing field and to the output of said gate converter; the outputs of said unit for computation of the differential magnetic permeability or susceptibility being connected to one of said calibrators;

a unit for computation of total electromagnetic losses having inputs and outputs; the inputs of said unit for computation of total electromagnetic losses being connected to the inputs and outputs of said channels for magnetization and magnetizing field; the outputs of said unit for computation of total electromagnetic losses being connected to the other of said calibrators;

an autoswitch having inputs and outputs; one input of said autoswitch being connected to the output of said phase corrector of the channel for magnetization; the other input of said autoswitch being connected to the output of said phase corrector of the channel for magnetizing field; the output of said autoswitch being connected to said deflecting plates of the cathode-ray tube;

a unit for shaping an image of scale-marked coordinate axes of magnetization and intensity having a input and an output; the input of said unit for shaping being connected to the output of said phase corrector of the channel for magnetization and to the output of said channel for the magnetizing field; the output of said unit for shaping being connected to the input of said autoswitch.

6. An oscilloscopic ferrometer according to claim 5, wherein said gate converter comprises: a converter of sinusoidal pulse into square pulses of the same period;

a flip-flop for division of the square pulse repetition rate by two connected in series with said sinusoidal pulse converter;

a monostable multivibrator with a variable time delay from nil to the value of the field period connected in series with said flip-flop;

a monostable multivibrator for shaping square gate pulses connected in series with said monostable multivibrator with a variable time delay;

an inverting amplifier connected in series with said monostable multivibrator for shaping square gate pulses having an output; the output of said inverting amplifier being connected to said control electrode of the cathode-ray tube.

7. An oscilloscopic ferrometer according to claim 5, wherein said unit for computation of the differential magnetic permeability or susceptibility comprises: an amplitude modulator for the magnetizing field having an input and an output whose input is connected to the output of said gate converter and to said phase corrector of the channel for the magnetizing field; an amplitude modulator for magnetization having an input and an output whose input is connected to said phase corrector of the channel for magnetization and to the output of said gate converter; an amplitude detector for the magnetizing field having inputs and outputs whose input is connected to the output of said amplitude modulator for the magnetizing field; and amplitude detector for magnetization having an input and an output whose input is connected to the output of said amplitude modulator for magnetization; a key connected to the output of said amplitude detector for magnetization; a timing pulse generator connected to said key; a voltage/time period converter having an input and an output whose input is connected to said key; a flip-flop having inputs and an output; the first input of said flip-flop being connected to the output of said voltage/time period converter; the second input of said flip-flop being connected to said timing pulse generator; the output of said flip-flop being connected to said key; an amplitude modulator having inputs and an output; one input of said amplitude modulator being connected to the output of said flip-flop; the other input of said amplitude modulator being connected to the output of said amplitude detector for magnetization; the output of said amplitude modulator being connected to the input of said calibrator.

8. An oscilloscopic ferrometer according to claim 5, wherein said unit for computation of total electromagnetic losses comprises: two squarers; an adder circuit having inputs and an output; one input of said adder circuit being connected to the output of said phase corrector of the channel for magnetizing field; the other input of said adder circuit being connected to said input of the integrator of the channel for magnetization; the output of said adder circuit being connected to one of said squarers; a subtractor having inputs and an output; one input of said subtractor being connected to the output of said phase corrector of the channel for magnetizing field; the other input of said subtractor being connected to said input of the integrator of the channel for magnetization; the output of said subtractor being connected to the other of said squarers; a subtractor circuit having two inputs and an output; each input of said subtractor circuit being connected to each of said squarers; an integrator having an input and an output; the input of said integrator being connected to the output of said subtractor circuit; the output of said integrator being connected to said calibrator.

9. An oscilloscopic ferrometer according to claim 5, wherein said unit for shaping an image of scale-marked coordinate axes comprises: a scale-marking pulse generator coupled to the output of said phase corrector of the channel for the magnetizing field; a sawtooth generator; at least two frequency dividers connected in series; the first one of said frequency dividers being connected to said scale-marking pulse generator; the last one of said frequency dividers being connected to said sawtooth generator; two comparison circuits each having inputs and an output; the inputs of the first comparison circuit being connected to the output of said phase corrector of the channel for the magnetizing field and to said sawtooth generator; the inputs of the second comparison circuit being connected to the output of said phase corrector of the channel for magnetization and to said sawtooth generator; a flip-flop having an input and an output; the input of said flip-flop being connected to the last one of said frequency dividers; a first group of coincidence circuits each having two inputs and an output; one input of each of said coincidence circuits being connected to the output of the respective one of said comparison circuits; the other input of each of said coincidence circuits being connected to the output of said flip-flop; two keys each being connected to the output of the respective one of said coincidence circuits and to the input of said autoswitch; a second group of coincidence circuits each having inputs and outputs; one input of each coincidence circuit of the second group being connected to said flip-flop; a second input of each coincidence circuit of the second group being connected to said scale-marking pulse generator; a third input of each coincidence circuit of the second group being connected to said first frequency divider; the outputs of all of said coincidence circuits of the second group being connected to the inputs of said autoswitch.

10. An oscilloscopic ferrometer according to claim 6, wherein said unit for computation of the differential magnetic permeability or susceptibility comprises: an amplitude modulator for the magnetizing field having an input and an output whose input is connected to the output of said gate converter and to said phase corrector of the channel for the magnetizing field; an amplitude modulator for magnetization having an input and an output whose input is connected to said phase corrector of the channel for magnetization and to the output of said gate converter; an amplitude detector for the magnetizing field having an input and outputs whose input is connected to the output of said amplitude modulator for the magnetizing field; an amplitude detector for magnetization having an input and an output whose input is connected to the output of said amplitude for magnetization; a key connected to the output of said amplitude detector for magnetization; a timing pulse generator connected to said key; a voltage/time period converter having an input and an output whose input is connected to said key; a flip-flop having inputs and an output; the first input of said flip-flop being connected to the output of said voltage/time period converter; the second input of said flip-flop being connected to said timing pulse generator; the output of said flip-flop being connected to said key; an amplitude modulator having inputs and an output; one input of said amplitude modulator being connected to the output of said flip-flop; the other input of said amplitude modulator being connected to the output of said amplitude detector for magnetization; the output of said amplitude modulator being connected to the input of said calibrator.

11. An oscilloscopic ferrometer according to claim 6, wherein said unit for computation of total electromagnetic losses comprises; two squarers; an adder circuit having inputs and an output; one input of said adder circuit being connected to the output of said phase corrector of the channel for magnetizing field; the other input of said adder circuit being connected to said input of said integrator of the channel for magnetization; the output of said adder circuit being connected to one of said squarers; a subtractor having inputs and an output; one input of said subtractor being connected to the output of said phase corrector of the channel for magnetizing field; the other input of said subtractor being connected to said input of the integrator of the channel for magnetization; the output of said subtractor circuit having two inputs and an output; each input of said subtractor circuit being connected to the respective one of said squarers; an integrator having an input and an output; the input of said integrator being connected to said output of said subtractor circuit; the output of said integrator being connected to said calibrator.

12. An oscilloscopic ferrometer according to claim 6, wherein said unit for shaping an image of scale-marked coordinate axes comprises: a scale-marking pulse generator coupled to the output of said phase corrector of the channel for the magnetizing field; a sawtooth generator; at least two frequency dividers connected in series; the first one of said frequency dividers being connected to said scale-marking pulse generator; the last one of said frequency dividers being connected to said sawtooth generator; two comparison circuits each having inputs and an output; the inputs of the first comparison circuit being connected to the output of said phase corrector of the channel for the magnetizing field and to said sawtooth generator; the inputs of the second comparison circuit being connected to the output of said phase corrector of the channel for magnetization and to said sawtooth generator; a flip-flop having an input and an output; the input of said flip-flop being connected to the last one of said frequency dividers; a first group of coincidence circuits each having two inputs and an output; one input of each coincidence circuit being connected to the output of the respective one of said comparison circuits the other input of each coincidence circuit being connected to the output of said flip-flop; two keys each being connected to the output of the respective one of said coincidence circuits and to the input of said autoswitch; a second group of coincidence circuits each having inputs and outputs; one input of each coincidence circuit of the second group being connected to said flip-flop; a second input of each coincidence circuit of the second group being connected to said scale-marking pulse generator; a third input of each coincidence circuit of the second group being connected to said first frequency divider; the outputs of all of said coincidence circuits of the second group being connected to the inputs of said autoswitch.

13. An oscilloscipic ferrometer according to claim 7, wherein said unit for computation of total electromagnetic losses comprises: two squarers; an adder circuit having inputs and an output; one input of said adder circuit being connected to the output of said phase corrector of the channel for magnetizing field; the other input of said adder circuit being connected to said input of the integrator of the channel for magnetization; the output of said adder circuit being connected to one of said squarers; a subtractor having inputs and an output; one input of said subtractor being connected to the output of said phase corrector of the channel for magnetizing field; the other input of said subtractor being connected to said input of the integrator of the channel for magnetization; the output of said subtractor being connected to the other of said squarers; a subtractor circuit having two inputs and an output; each input of said subtractor circuit being connected to the respective one of said squarers; an integrator having an input and an output; the input of said integrator being connected to the output of said subtractor circuit; the output of said integrator being connected to said claibrator.

14. An oscilloscopic ferrometer according to claim 7, wherein said unit for shaping an image of scale-marked coordinate axes comprises: a scale-marking pulse generator coupled to the output of said phase corrector of the channel for the magnetizing field; a sawtooth generator; at least two frequency dividers connected in series; the first one of said frequency dividers being connected to said scale-marking pulse generator; the last one of said frequency dividers being connected to said sawtooth generator; two comparison circuits each having inputs and an output; the inputs of the first comparison circuit being connected to the output of said phase corrector of the channel for the magnetizing field and to the sawtooth generator; the inputs of the second comparison circuit being connected to the output of said phase corrector of the channel for magnetization and to said sawtooth generator; a flip-flop having an input and an output; the input of said flip-flop being connected to the last one of said frequency dividers; a first group of coincidence circuits each having two inputs and an output; one input of each coincidence circuit being connected to the output of the respective one of said comparison circuits; the other input of each coincidence circuit being connected to the output of said flip-flop; two keys each being connected to the output of the respective one of said coincidence circuits and to the input of said autoswitch; a second group of coincidence circuits each having inputs and outputs; one input of each coincidence circuit of the second group being connected to said flip-flop; a second input of each coincidence circuit of the second group being connected to said scale-marking pulse generator; a third input of each coincidence circuit of the second group being connected to said first frequency divider; the outputs of all of said coincidence circuits of the second group being connected to the inputs of said autoswitch.

15. An oscilloscopic ferrometer according to claim 8, wherein said unit for shaping an image of scale-marked coordinate axes comprises: a scale-marking pulse generator coupled to the output of said phase corrector of the channel for the magnetizing field; a sawtooth generator; at least two frequency dividers connected in series; the first one of said frequency dividers being connected to said scale-marking pulse generator; the last one of said frequency dividers being connected to said sawtooth generator; two comparison circuits each having inputs and an output; the inputs of the first comparison circuit being connected to the output of said phase corrector of the channel for magnetizing field and to the sawtooth generator; the inputs of the second comparison circuit being connected to the output of said phase corrector of the channel for magnetization and to said sawtooth generator; a flip-flop having an input and an output; the input of said flip-flop being connected to the last one of said frequency dividers; a first group of coincidence circuits each having two inputs and an output; one input of each coincidence circuit being connected to the output of the respective one of said comparison circuits; the other input of each coincidence circuit being connected to the output of said flip-flop; two keys each being connected to the output of the respective one of said coincidence circuit and to the input of said autoswitch; a second group of coincidence circuits each having inputs and outputs, one input of each coincidence circuit of the second group being connected to the flip-flop; a second input of each coincidence circuit of the second group being connected to said scale-marking pulse generator; a third input of each coincidence circuit of the second group being connected to said first frequency divider; the outputs of all of said coincidence circuits of the second group being connected to the inputs of said autoswitch.

16. An oscilloscopic ferrometer according to claim 9, comprising a phase correction monitoring unit including a two positional switch having contact groups for two positions; the contact group for the first position being connected to said integrator of the measuring channel for magnetization and said integrator of the measuring channel for the magnetizing field; the contact group for the second position being connected to said flip-flop of the unit for shaping an image; a mixer for triangular pulses and scale-marking pulses having inputs and an output; one input of said mixer being connected to said scale-marking pulse generator of the unit for shaping an image; the other input of said mixer being connected to any desired number of said frequency dividers of the unit for shaping an image; a second two positional switch having contact groups for two positions and operating in a timed relation with said first-mentioned two positional switch; the contact group for the first position of said second switch being connected to said phase correctors of the measuring channels for magnetization and the magnetizing field, so that, when the output of said mixer is connected, via the contact group for the first position of said second switch, to the phase corrector of the channel for the magnetizing field, said flip-flop is connected to said integrator of the channel for magnetization, via the contact group for the first position of said first switch, and, when the output of said mixer is connected to said phase corrector of the channel for magnetization, said flip-flop is connected to said integrator of the channel for the magnetizing field.

17. An oscilloscopic ferrometer according to claim 10, wherein said unit for computation of total electromagnetic losses comprises: two squarers; an adder circuit having inputs and an output; one input of said adder circuit being connected to the output of said phase corrector of the channel for magnetization; the other input of said adder circuit being connected to said input of said integrator of the channel for magnetization; the output of said adder circuit being connected to one of said squarers; a subtractor having inputs and an output; one input of said subtractor being connected to the output of said phase corrector of the channel for magnetizing field; the other input of said subtractor being connected to said input of the integrator of the channel for magnetization; the output of said subtractor being connected to the other of one of said squarers; a subtractor circuit having two inputs and an output; each input of said subtractor circuit being connected to the respective one of said squarers; an integrator having an input and an output; the input of said integrator being connected to said output of said subtractor circuit; the output of said integrator being connected to said calibrator.

18. An oscilloscopic ferrometer according to claim 10, wherein said unit for shaping an image of scale-marked coordinate axes comprises; a scale-marking pulse generator coupled to the output of said phase corrector of the channel for the magnetizing field; a sawtooth generator; at least two frequency dividers connected in series; the first one of said frequency dividers being connected to said scale-marking pulse generator; the last one of said frequency dividers being connected to said sawtooth generator; two comparison circuits each having inputs and an output; the inputs of the first comparison circuit being connected to the output of said phase corrector of the channel for the magnetizing field and to said sawtooth generator; the inputs of the second comparison circuit being connected to the output of said phase corrector of the channel for magnetization and to said sawtooth generator; a flip-flop having an input and an output; the input of said flip-flop being connected to the last one of said frequency dividers; a first group of coincidence circuits each having two inputs and an output; one input of each coincidence circuit being connected to the output of the respective one of said comparison circuits; the other input of each coincidence circuit being connected to the output of said flip-flop; two keys each being connected to the output of the respective one of said coincidence circuits and to the input of said autoswitch; a second group of coincidence circuits each having inputs and outputs; one input of each coincidence circuit of the second group being connected to said flip-flop; a second input of each coincidence circuit of the second group being connected to said scale-marking pulse generator; a third input of each coincidence circuit of the second group being connected to said first frequency divider; the outputs of all of said coincidence circuits of the second group being connected to the inputs of said autoswitch.

19. An oscilloscopic ferrometer according to claim 17, comprising a phase correction monitoring unit including: a two positional switch having contact groups for two positions; the contact group for the first position being connected to said integrator of the measuring channel for magnetization and said integrator of the measuring channel for the magnetizing field; the contact group for the second position being connected to said flip-flop of the unit for shaping an image; a mixer for triangular pulses and scale-marking pulses having inputs and an output; one input of said mixer being connected to said scale-marking pulse generator of the unit for shaping an image; the other input of said mixer being connected to any desired number of said frequency dividers of the unit for shaping an image; a second two positional switch having contact groups for two positions and operating in a timed relation with said first-mentioned two positional switch; the contact group for the first position of said second switch being connected to said phase correctors of the measuring channels for magnetization and the magnetizing field so that, when the output of said mixer is connected, via the contact group for the first position of said second switch, to the phase corrector of the channel for the magnetizing field, said flip-flop is connected to said integrator of the channel for magnetization, via the contact group for the first position of said first switch, and, when the output of said mixer is connected to said phase corrector of the channel for magnetization, said flip-flop is connected to said integrator of the channel for the magnetizing field.

* * * * *